Sept. 8, 1942.          C. M. SUMMERS          2,295,305
                          MOTOR CIRCUIT
                       Filed Oct. 23, 1941
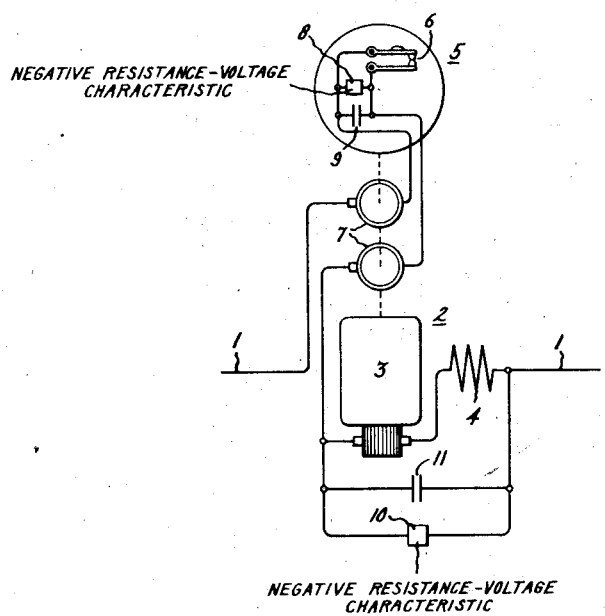
Inventor:
Claude M. Summers,
by Harry E. Dunham
        His Attorney.

Patented Sept. 8, 1942

2,295,305

UNITED STATES PATENT OFFICE 2,295,305

MOTOR CIRCUIT

Claude M. Summers, Fort Wayne, Ind., assignor to General Electric Company, a corporation of New York Application October 23, 1941, Serial No. 416,236

10 Claims. (Cl. 171—229)

This invention relates to electric motor circuits and more particularly to circuits of this type wherein the speed of the motor is regulated by a contact governor.

In Patent No. 2,184,344, granted December 26, 1939, on an application of L. F. Hemphill and assigned to the assignee of the present application, there is disclosed a circuit of this type in which the audio noise producing effect of the voltage surges resulting from the vibratory action of the contacts of the speed governor is minimized by the use of an impedance connected across the motor. The term "audio noise" is used in contra-distinction to radio noise, such as is produced by radio interference, and it denotes the direct production of noise by the motor elements themselves. Experience with the Hemphill circuit has shown that although the noise is substantially reduced, relatively high voltage surges are still produced and that occasionally these surges break down the spark suppressing capacitor which is connected across the governor contacts. In the case of standard universal fractional horsepower series motors for 110-volt service these surge voltages often reach values as high as 900 volts and they have been known to rupture the insulation of other devices connected to the motor circuit.

In accordance with this invention I have discovered that if a negative resistance-voltage characteristic resistance of the instantaneously acting type is connected across the governor contacts these voltage surges are very substantially reduced. For example, their peak value may readily be reduced fifty per cent. This negative characteristic resistance may be substituted for the conventional regulating resistance which is connected across the governor contacts. So far as voltage surge reduction is concerned, the usual capacitor which is connected across the contacts may be omitted but it has been found that in order to obtain maximum contact life it is desirable to use a relatively small capacitor connected in parallel with the negative resistor across the governor contacts. The usual value of the spark suppressing capacitor connected across the contacts, such as is shown in the Hemphill patent, has a value of about 0.25 microfarad. However, in accordance with my invention when a negative characteristic resistor is used across the governor contacts the capacitor may be reduced to one having no more than 0.05 microfarad.

It has also been found that a negative resistance voltage characteristic resistor of the instantaneously active type connected across the motor or the noise emitting elements thereof and in series circuit relation with the governor contacts is effective in reducing the motor noise either when used alone or in combination with a parallel connected capacitor. In the latter case the size of the capacitor may be materially reduced from its typical value of 1.5 microfarads.

The negative characteristic resistor may be of any suitable type, such as the resistors now on the market under the trade-names of "Thyrite" and "Globar". These are synthetic ceramic resistance materials which include graphite or carborundum or both and they are characterized by no time lag and relative independence from substantial temperature effects. The former material is described and claimed in Patent No. 1,822,742, granted September 8, 1931, on an application of K. B. McEachron and assigned to the assignee of the present application. I have found that by using material of this type in accordance with my invention the contact life is improved, the audible noise is substantially reduced, the voltage surges are materially reduced, radio interference is more effectively suppressed and in addition all of these results are obtained more economically from a cost and space standpoint than when capacitors alone are used as in the Hemphill patent.

An object of the invention is to provide a new and improved electric motor circuit.

Another object of the invention is to provide an improved circuit for reducing voltage surges in contact governed motor circuits.

A further object of the invention is to provide an economical and compact circuit arrangement for improving the contact life, reducing the audio and radio noise and lowering the voltage surges resulting from contact governor control of fractional horsepower motors.

The invention will be better understood from the following description taken in connection with the accompanying drawing and its scope will be pointed out in the appended claims.

Referring now to the single figure of the accompanying drawing, which illustrates diagrammatically an embodiment of my invention, there is shown therein a supply circuit 1 to which is connected an electric motor 2. This motor is shown by way of example as a fractional horsepower universal series motor having an armature 3 and a field winding 4. Mounted on the motor shaft is a contact governor 5 having a pair of contacts 6 connected in series with the motor by means of slip rings 7. These contacts are normally closed but are arranged to open by centrifugal force exceeding a predetermined value thereby to de-energize the motor until its speed returns to normal whereupon the contacts reclose. In this manner the average speed of the motor is held at a predetermined value as determined by the setting of the governor. The contact action is so rapid that pulsations in motor speed normally are not noticeable.

For reducing the voltage surges resulting from the action of the contacts 6 in making and breaking the inductive circuit constituting the motor 2 there is provided a negative resistance-voltage characteristic resistor 8 connected across the governor contacts. As previously stated, this resistor may be of any well-known type having the property of substantially instantaneously reducing its resistance when the voltage across it or the current through it increases. In the case of "Thyrite" this resistance has a characteristic defined by the equation $RI^a=C$ where R is its resistance, I is the current through it, $a$ is an exponent typically 0.7, the value of which is determined by the controls used in the manufacture of the material, and C is a constant determined by the physical dimensions of the resistor. On the other hand, a suitable Globar resistor may consist of a disk 1½ inches in diameter and ½ inch thick with its flat surfaces metallized with brass. This resistor has the following resistance characteristics:

3350 ohms at 100 volts direct current
890 ohms at 200 volts direct current
375 ohms at 300 volts direct current.

For insuring maximum contact life a small capacitor 9 is connected in parallel with the resistor 8.

If the reduced voltage surges still cause the motor to produce an objectionable amount of noise, this noise may be further reduced by means of another negative characteristic resistor 10 connected thereacross. This resistor may be of the same material as the resistor 8. A capacitor 11 may also be connected in parallel with the resistor 10 for further reducing the noise.

The resistor 8 is preferably mounted on the rotating element of the contact governor so as to obtain forced ventilation around this resistor so that a smaller unit can be used.

In the operation of the invention the substantially instantaneous decrease in resistance of the negative characteristic resistor effectively limits voltage surges which are impressed thereacross.

While there has been shown and described a particular embodiment of this invention, it will be obvious to those skilled in the art that various changes and modifications can be made herein without departing from the invention and, therefore, it is aimed in the appended claims to cover all such changes and modifications as fall within the true spirit and scope of the invention.

What I claim as new and desire to secure by Letters Patent of the United States, is:

1. In combination, a supply circuit, an electric motor connected therein, a rotatable vibratory contact speed governor driven by said motor and having a pair of contacts connected in circuit with said motor, and a negative resistance-voltage characteristic resistor of the instantaneously acting type connected across said contacts so as to provide the functions of both a regulating resistance and a spark suppressor.

2. In the combination as set forth in claim 1, said negative resistor having the characteristic defined by the equation $RI^a=C$ where R is its resistance, I is the current through it, $a$ is a fixed exponent and C is a constant.

3. The combination as set forth in claim 1 in which said negative characteristic resistor is mounted for rotation with said governor so as to be cooled by the windage produced by said rotation.

4. In combination, a supply circuit, an electric motor connected therein, a vibratory contact speed governor for said motor, said governor having a pair of contacts connected in circuit with said motor, a relatively small-size spark suppressing capacitor connected across said contacts, said capacitor alone being inadequate to protect said contacts against sparking, and means for supplementing the spark suppressing action of said capacitor so as to produce adequate protection of said contacts comprising a negative resistance voltage characteristic resistor of the instantaneously acting type connected across said contacts, said resistor serving also as a regulating resistance.

5. The combination as set forth in claim 1, together with a negative resistance-voltage characteristic resistor of the instantaneously acting type connected across said motor and in series circuit relation with the contacts of said governor.

6. In combination, a supply circuit, an electric motor connected thereto, a vibratory contact speed governor driven by said motor and having a pair of contacts connected in circuit with said motor, a negative characteristic resistor connected across said motor and in series circuit relation with the contacts of said governor, said resistor having the characteristic defined by the equation $RI^a=C$ where R is its resistance, I is the current through it, $a$ is a fixed exponent and C is a constant.

7. In combination, a supply circuit, an electric motor connected thereto, a contact governor driven by said motor and having a pair of contacts connected in circuit with said motor, and a negative resistance current characteristic resistor of the instantaneously active type connected across said motor and in series circuit relation with the contacts of said governor.

8. In combination, a supply circuit, an electric motor connected thereto, a contact governor driven by said motor and having a pair of contacts connected in circuit with said motor, a relatively small-size audio noise suppressing capacitor connected across said motor and in series circuit relation with the contacts of said governor, said capacitor alone being insufficient to provide adequate audio noise suppression, and means for supplementing the action of said capacitor so as to provide over-all adequate noise suppression comprising a negative resistance current characteristic resistor of the instantaneously acting type connected in parallel circuit relation with said capacitor.

9. In combination, a supply circuit, a series fractional horsepower motor of the universal type connected therein, a centrifugal speed governor for said motor having a pair of contacts connected in series therewith, a small-size capacitor connected across said contacts, means for reducing the magnitude of the voltage surges across said capacitor when said contacts open comprising a negative resistance-voltage characteristic resistor of the instantaneously acting type mounted on said governor and connected across said contacts, means for reducing the audio noise resulting from the governor control of said motor comprising a second capacitor connected across said motor and in series circuit relation with the contacts of said governor, and means for further reducing the audio noise resulting from the governor control of said motor comprising a second negative resistance voltage characteristic resistor of the instantaneously acting type connected across said second capacitor.

10. The combination as set forth in claim 9 in which said negative resistors are characterized by the equation $RI^a = C$ where R is its resistance, I is the current through it, $a$ is a fixed exponent and C is a constant.

CLAUDE M. SUMMERS.